June 10, 1947.  J. K. WOOD  2,421,822
SPRING DEVICE
Filed April 15, 1944  4 Sheets-Sheet 3

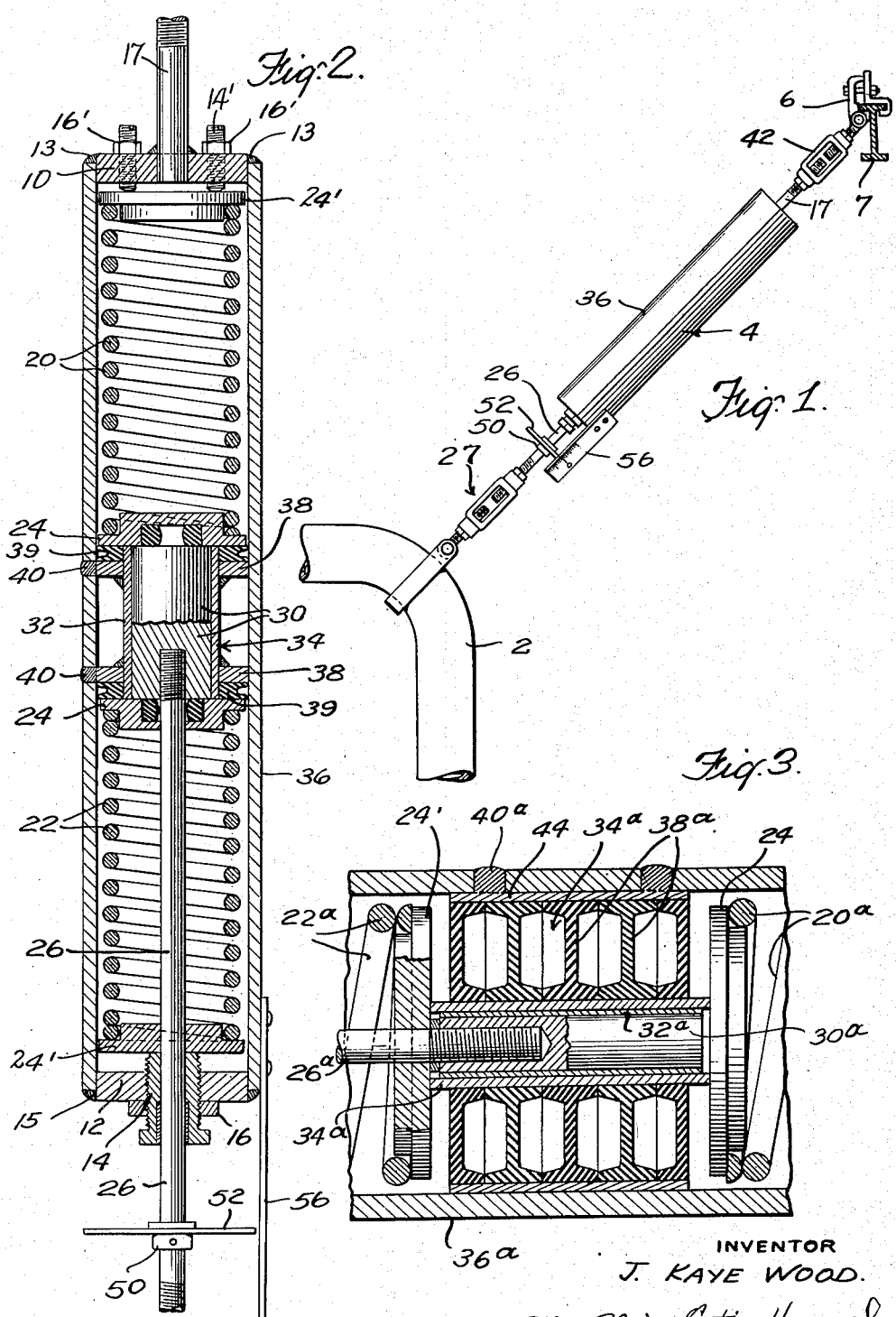

INVENTOR
J. KAYE WOOD
BY Blair, Curtis + Hayward
ATTORNEYS

June 10, 1947. J. K. WOOD 2,421,822
SPRING DEVICE
Filed April 15, 1944 4 Sheets-Sheet 4
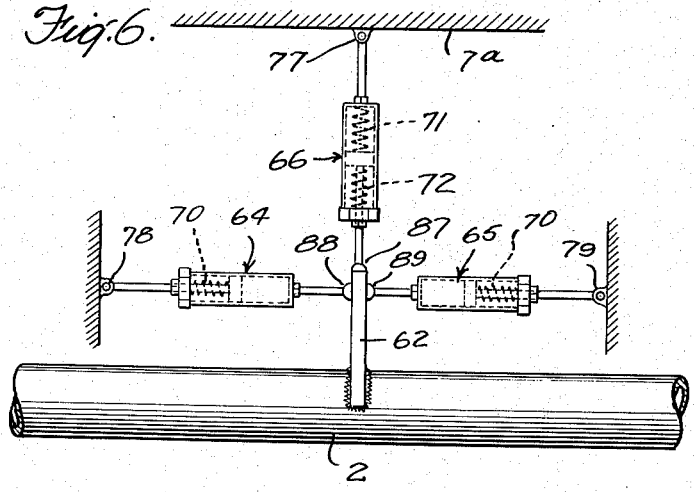
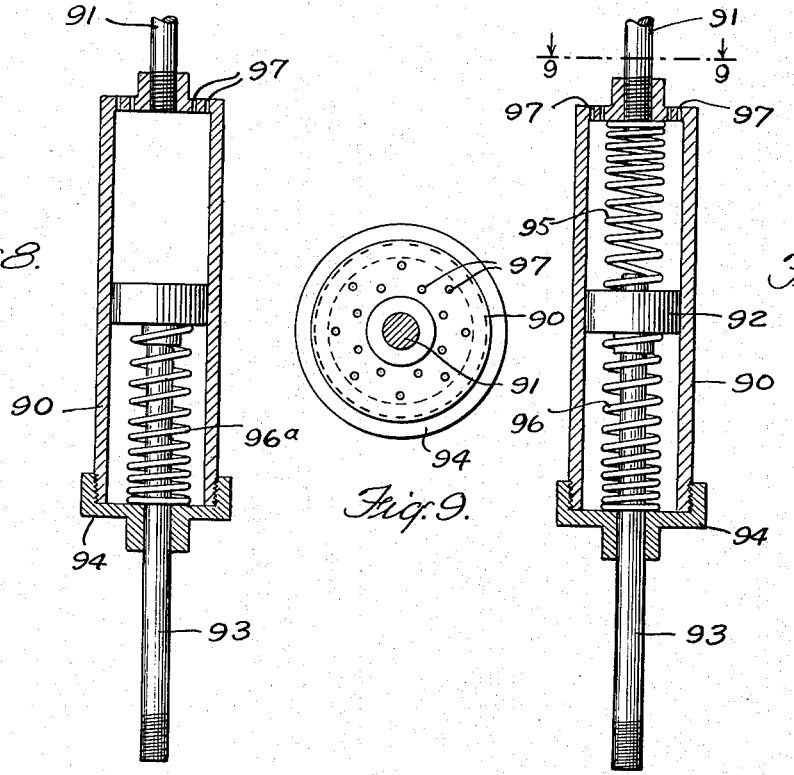
INVENTOR
J. KAYE WOOD.
BY
Blair, Curtis & Hayward
ATTORNEYS Patented June 10, 1947

2,421,822

UNITED STATES PATENT OFFICE 2,421,822

SPRING DEVICE

Joseph Kaye Wood, New York, N. Y., assignor to General Spring Corporation, New York, N. Y., a corporation of New York Application April 15, 1944, Serial No. 531,183

17 Claims. (Cl. 248—54)

This invention relates to mounting and steadying of pipe lines and other parts and more particularly to flexible mounting adapted to afford support against dynamic forces such as inertia and vibration or other harmonic movements and at the same time to relieve stresses between the mounted parts and the supporting structures, e. g., such as may develop in pipe lines subject to temperature changes and high pressures.

I have heretofore, in my Patents Nos. 1,816,164, 1,937,135, 2,145,704, 2,208,064, and 2,256,784, disclosed hangers which are adapted to support high temperature pipe lines or other equipment so as to allow limited vertical movement, but to avoid vibratory vertical movement. The commercial application of these hangers has emphasized the need for practical devices to steady pipe lines and other equipment against vibratory forces where the greater expense of providing constant support throughout substantial movement of the device is not a requirement.

Accordingly, it is an object of my present invention to provide a simple brace against swaying and "whipping" of piping and like equipment when subjected to vibratory forces.

It is another object of this invention to provide a horizontal sway brace for piping which will both damp out vibrations and accommodate expansion forces in a horizontal plane without affecting the vertical support of the pipe line.

It is another object of my present invention to provide a sway brace for a pipe line subject to expansion during use, which imposes no initial loading on the pipe line and which provides both resilient opposition to harmonic motion of the pipe line and also frictional opposition to such motion.

It is another object of my invention to provide a device which is entirely self-contained as a unit and which can be easily adjusted while in place.

It is another object of my invention to combine the advantages of rigid mountings with the greater safety and other advantages of resilient mountings.

In my prior copending application, Serial No. 390,415, filed April 25, 1941, of which this application is a continuation-in-part, I described certain fundamental principles necessary to damp out vibrations in pipe lines and showed by way of example certain equipment which could be used for such purposes. I have now further improved such equipment and provided a simple, compact and rugged unit as herein shown and described.

In the accompanying drawings, I have shown a preferred embodiment of my invention and the application thereof. These drawings and the following specification and description are not intended to be exhaustive nor limiting of the invention, but on the contrary are presented with a view to best explaining the invention and principles thereof and the best manner of embodying the same, and it is my intention to enable others skilled in the art to adapt and modify the invention and to construct it in such various forms as may be best adapted for the requirements of any particular condition.

In the drawings:

Figure 1 is a plan view of a typical pipe line showing the places where a brace made in accordance with my present invention will be used;

Figure 2 is a view partly in longitudinal section of a sway brace made in accordance with my invention;

Figure 3 is a fragmentary sectional view similar to Figure 2 but showing a modified construction;

Figure 6 is a plan view of a portion of a pipe line and sway braces arranged to damp it in several directions to absorb vibration;

Figure 7 is an enlarged section view of a unit such as might be used in Figure 6;

Figure 8 shows a view of a hanger using a spring unit such as might be used in Figure 6;

Figure 9 is a section taken along line 9—9 of Figure 7; and

Figure 4:
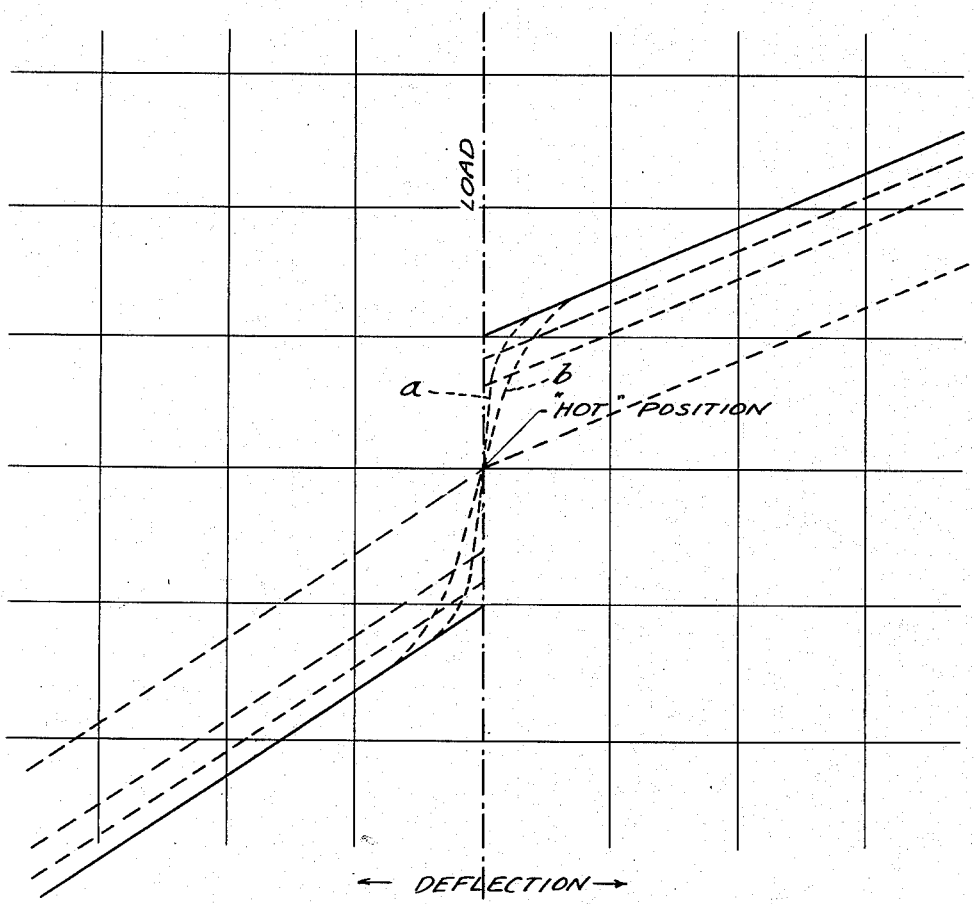
Figure 4 is a graph showing the characteristic curve of the device shown in Figure 2.

Referring first to Figure 1, I have shown a pipe line 2 having a bend therein and a sway brace 4 anchored at 6 to a structural frame member 7. In this position the sway brace is adapted to control both expansion and vibrational movements of the pipe line 2.

In Figure 2, I have shown an enlarged view of the sway brace 4. Referring specifically to this figure, I have shown a tube 36, extending the full length of the sway brace secured in its ends with end plugs 10 and 12. These end plugs are, in the example shown, permanently secured in place by welding at the periphery 13—15. The lower plug 12 is drilled and threaded for reception of the threaded end of the abutment 14 which is made with suitable means for engaging a wrench. In order to prevent this abutment from turning, a lock nut 16 is threaded onto the end and is tightened against part 12.

The upper end plug 10 has, in lieu of the abutment 14, studs 14' treated therein and secured in a given adjustment by the lock nuts 16'. A rod 17 welded into the end plug 10, as shown, serves as a part of the turnbuckle 42 to connect the device to the frame member 7.

The abutment member 14 is provided with a hole adapted to receive a rod 26 as more fully described below.

The spring group consists of opposed springs 20 and 22; in the case shown these springs are both compression springs and of approximately the same length when balanced against each other, but are of respectively different load/deflection characteristics. The ends of each of these springs are fitted onto plugs 24 or 24'.

The rod plunger 26 may be a simple rod threaded at its outer end into a turnbuckle 27, as shown at 27 in Figure 1, or may be formed with an eye or clevis or other connection, to attach it to the anchor or pipe line connection; and is threaded at its other end so as to screw into the plunger 30.

The opposite ends of this plunger member 30 bear respectively against the end plugs 24 through the rubber cushion rings 39, so that as it moves in either direction it engages one or the other of these abutments and consequently must move against the resistance of the spring. A bearing sleeve 32a may be used, as shown in Figure 3, to control the friction of the plunger 30a, and to this end may be made of a suitable bearing metal such as bronze, brass, babbit, or advantageously a powdered bearing metal and graphite mixture compressed and/or sintered into a structurally strong sleeve.

The plunger 30 with or without such bearing sleeve, is supported and guided in its movement by the central abutment 34, which consists of the tubular bearing portion 36 and centering washers 38. In the structure shown in Figure 2, the washers 38 are welded to the tube 36 at a short distance from its ends, and buffer washers 39 of rubber or other shock absorbing material are slipped over the projecting ends. This assembly is inserted into the cylinder 36 before the heads 10 and 12 are secured in place, the washers 38 are then held in position while welds 40 are made at circumferentially spaced points, as shown.

The cylinder 36 may be filled with liquid or air to give a dashpot damping action. If liquid is used, a packing gland can be used in the abutment 14 and if air is relied upon for dashpot action an opening may be provided in each end 10 and 12 and the abutments 14 and 14' or through the plunger 30 or the abutment 34. Such dashpot action, however, is not essential to my invention and the device as shown is effective to damp resonant motion even if the cylinder is effectively sealed.

In use, the device may be connected between a pipe line and a supporting frame as shown for example in Figure 1. The final attachment is preferably made when the pipe is ot operating temperature and the abutments and the turnbuckles 27 and/or 42 adjusted at the same time so as to leave the plunger 30 centered in the bearing 32 and the plugs 24, 24' bearing on the ends of the abutment 34. Thus the pipe 2 in its quiet condition is not pre-loaded. As soon as the pipe moves, however, the plunger 30 picks up one or the other of the end plugs 24 or 24' and thus compresses one or the other of the springs 20 or 22. The spring thus opposes the initial motion, but if the motion were periodic and tuned to the elastic system including the spring 20 or 22, the spring might actually come to amplify such motion, if it were not that the action of each spring is terminated at a mid-position and the other spring of different load/deflection characteristic brought into action. Any tendency to resonance of the one spring or one-half cycle of a vibratory movement is thus opposed by the other spring on the other half cycle, so that resonant motion cannot develop.

This is illustrated by the graph of Figure 4, wherein it is evident that as the plunger passes through its mid-position represented by the vertical line, the slope of the curve not only is reversed but is changed in angle as well. The broken lines on this graph represent different adjustments of the springs.

The lowermost line of Figure 4 represents the special case in which both springs are in a relaxed or neutral condition at the mid-position, in the higher lines the springs are actually compressed against the abutment 34 so that the initial movement meets high resistance; nevertheless, because of the abutment 34, there is no pre-loading of the pipe when at rest and the force exerted on the pipe by the springs is zero at the position represented by the vertical line.

Since, as will be evident, the abutment 34 is subjected to considerable hammering by the springs and their end plugs 24, 24' during any vibratory movements of the piping, it is advantageous to design the abutment 34 to absorb more readily and quietly these impacts. To some extent this end may be served by friction in the bearing 32 or by dashpot action as suggested above. It is also served by the washers 39 and 31. If desired only one of these expedients may be used to cushion the impact or several expedients may be used, each aiding the other. The curved lines indicated at $a$ and $b$ on Figure 4 respectively represent the compression and relaxation of the rubber buffers 31 and 39.

In Figure 3, I have shown an effective structure for absorbing the impacts of such hammering. Here a so-called Lord bushing is used for the abutment 34a. This consists of an outer steel sleeve 44 to which are vulcanized or cemented the rubber washers 38a, which at their inner edges are likewise vulcanized or cemented to the bearing tube 36a. The latter projects far enough beyond the sleeve 44 so that upon striking the abutment 34a the plug 24 or 24' causes a deflection of the rubber discs 38a and their inertial energy is thus quickly absorbed. This effect is similar to that illustrated by the steep curves $a$ and $b$ in dotted lines from the upper full line graph of Figure 4.

The adjustment of the neutral position of relaxation or the degree of compression of the springs against the abutment 34 is accomplished, in the embodiment shown, by screwing the abutments 14 and/or 14' in or out and the proper adjustment when attained is locked by setting down the lock nuts 16 and 16'. An indicator nut 50 is pinned on the rod 26 beyond the abutment 14' and provided with a narrow disc or flange 52 which extends to the indicator scale arm 56. The latter is provided with a scale to show when the plunger 30 is in its zero position or the extent of compression of either spring.

This pre-stressing of the springs, as by adjustment of the abutments 14, 14' to compress the springs against the abutment 34, is an important, although not an essential, feature of my invention. In this way it is possible to set the spring so that it will not allow substantial movements in response to stresses within safe limits having regard to the strength of the piping or other supported apparatus, and yet will always yield to stresses which might otherwise result in failures. Thus I combine the advantages of rigid mountings with the added safety of resilient spring mountings.

Figure 5:
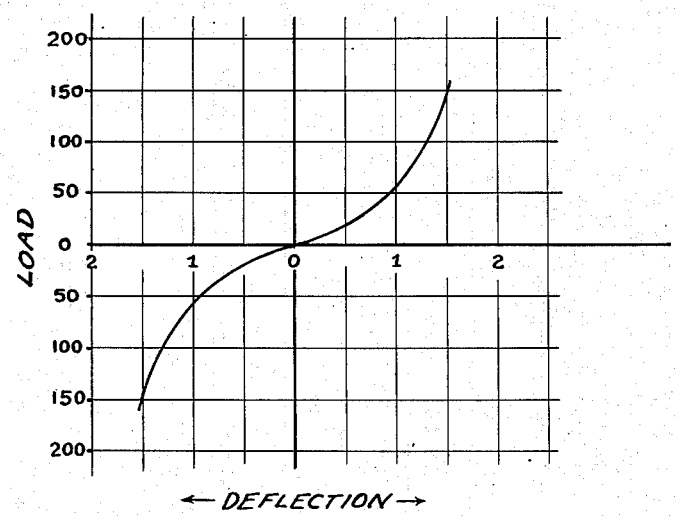
Figure 5 is a graph showing the characteristic curve of the device shown in Figure 6.

In the graph shown in Figure 5, the load/deflection curves of the device are not straight lines. This results from the use of springs of varying pitch as shown, for example, in Figures 6 to 9.

As shown, the opposite curves are identical, which would be the case with identical springs used on opposite sides of the plunger. This identity does not result in resonant harmonic motion in this case, because of the varying load/deflection rate brought about by the progressive removal from action of the closest turns of the varying pitch springs as they are further compressed. It will be understood, however, from what has been said above in connection with Figure 4, that it is not essential to have the springs identical and there is even advantage in having them of different characteristics.

In Figure 6, I have shown a modified embodiment of my invention in which a pipe line 2 has a web member 62 welded to it at right angles with the axis of the pipe line. Between this web member 62 and the anchorage 7a are placed spring units 64, 65 and 66; 64 and 65 being located longitudinally of the pipe line, and 66 being located at right angles to the pipe line in a horizontal plane.

As discussed above in connection with Figure 5, the springs 70, 71 and 72 are varied pitch helical compression springs. In order not to interfere with the vertical support I have shown the use of ball and socket joints at 77, 78 and 79 and at 87, 88 and 89. It may be advantageous, however, to rigidly attach the members 64 and 65 to the web 62, and arrange vertical slides in which they may slide. It will still be necessary in this case, of course, to provide ball and socket or other universal joints for the unit 66, if this unit is used, to allow for longitudinal movement of the pipe.

In Figure 7, I have shown a spring unit such as could be used between the edge of the web 62 and the wall 7a in Figure 6. This spring unit consists of a casing 90 attached to the anchorage through the rod 91. Inside of the cylinder 90 is fitted a piston 92 connecting with the rod 93. Over the open end of the cylinder is screw a cap 94 which is machined with a sliding surface through which the piston rod 93 slides. Inside the cylinder 90 are placed two springs 95 and 96, the spring 95 being between the piston and cylinder head, and the spring 96 being concentric with the piston rod 93, between the piston and the cylinder cap 94. Each of these springs may advantageously be a varied pitch spring as heretofore described. I have shown the piston 92 to fit in substantially air-tight relation to the walls of the cylinder 90 with vents 97—97 of such size as to produce a pneumatic dashpot action upon movement of the piston 92, thus providing substantial damping of the piston and load. Since there is no packing between the piston 92 and the cap 94, adequate air leakage may take place, without the drilling of holes in this cap. However, if desired, a hole or holes may be provided on the inside surface or the hole through which the piston rod 93 passes may be fluted.

In Figure 8, I have shown a section of a unit such as may be used at 64 or 65 of Figure 6, or it may be used to support a pipe line vertically. In this spring member only one spring 96a is used, and the spring which would correspond to 95 is omitted.

In Figure 9, I have shown in an enlarged view one end of the cylinder of Figure 7, illustrating the use of a series of small holes 97 to obtain the damping effect by limited flow of air into and out of the cylinder—an "air dashpot" effect.

Although compression coil springs are generally preferred for engineering uses because of greater factors of safety in the limitation of deflection and their continued support even after fracture in the spring wire may occur, it is to be understood that my invention is not limited to such springs. As an illustration of its adaptability to any type of spring device, I have shown in Figure 10 a device utilizing tension coil springs in accordance with my invention. This has the advantage that, as the turns of each coil close against each other under tension corresponding to the "backwind" of the spring, the action of the spring is automatically limited and thus no central abutment is needed. In this case, as in Figure 2, the springs are of different characteristics; and since they act separately and intermittently in opposition to any periodic force each on its half cycle tends to bring the system to its own natural period different from that of the other and thus each damps any tendency to resonance which may have developed in the other. "Backwind" as used above means the angle or pitch of the wire toward the body of the spring during winding of the coil which leaves the coils pre-stressed against one another.

Figure 10:
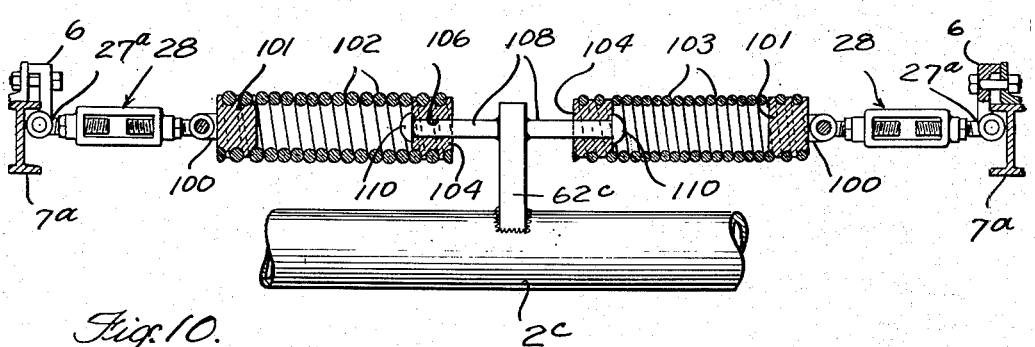
Figure 10 is a view partly in section and partly in elevation of another embodiment of my invention using tension springs.

In Figure 10, the anchorage is on the frame 7a, as in Figure 1. The clamps 6 are connected through the clevises 27a and turnbuckles 28 to the clevises 100 on the end plugs 101 of the springs 102 and 103. An end plug 104 in the opposite end of each spring is provided with an opening 106 in which is fitted a bolt or plunger rod 108. A head or other abutment 110 limits the movement of the bolt in the end plug and thus causes the bolt to extend the spring on movement of the pipe or other supported apparatus. The web member 62c is welded to the pipe 2c and to the bolt 108 at a mid-point on the bolt. The turnbuckles are adjusted so that when the pipe is in operating condition the web is at the mid-point with the heads 110 approximately bearing but with little, if any, force against the plugs 104. Upon movement of the pipe in either direction, the movement is transmitted through the web 62c to the bolt 108 and thereby one of the springs is extended. The other end of the bolt 108 meanwhile moves freely into the center of the other spring through its end plug 104.

Although I have shown in each case two-way support, it is obvious that in cases where stresses beyond the safe limits for the piping would occur in only one direction, only one spring and its cooperating parts would be used instead of two. Likewise numerous other variations are possible within the scope of my invention.

I claim:

1. A device for mounting piping or the like rigidly against dynamic forces within a safe limit of stress but to yield non-harmonically to greater forces which comprises spring means, means for limiting the relaxation of the spring means to retain therein a force equal to said safe limit of stress, plunger means adapted under force exerted by the piping to move against the force of said spring when such force exceeds said safe limit of stress, and means for connecting said spring means and said plunger means one to the piping and the other to an anchorage.

2. A device for mounting piping or the like rigidly against dynamic forces within a safe limit of stress but to yield non-harmonically to greater forces which comprises opposed springs of different load-deflection characteristics, means for limiting the relaxation of each spring to an extent approximating said safe limit of stress, plunger means between said springs adapted to substantially engage both of said springs in their limited positions and to distort either spring from said limit independently of the other, and means for connecting the outer ends of said springs and said plunger means one to the piping and the other to an anchorage.

3. A device for mounting piping or the like which comprises spring means for resisting movement of the piping or the like in opposite directions respectively, means limiting to one side of the neutral condition elastic deflection of each spring of the spring means, whereby to prevent harmonic oscillation of the spring, means adapted for connecting the piping or the like and an anchorage therefor respectively to parts of said spring means for elastic deflection of a spring thereof by relative movement between them in either direction away from a predetermined mid-position.

4. A device as defined in claim 3 which further comprises means for absorbing, during the return of each spring toward the neutral position, at least a part of the energy released by said spring after its deflection.

5. A device as defined in claim 3 which further comprises friction means for absorbing, during the return of each spring toward the neutral position, at least a part of the energy released by said spring after its deflection.

6. A device as defined in claim 3 which further comprises dashpot means for absorbing, during the return of each spring toward the neutral position, at least a part of the energy released by said spring after its deflection.

7. A sway brace for piping which comprises opposed cylinders each having at its outer end an abutment for one end of a spring, compression springs in said cylinders of respectively different load/deflection characteristics, an abutment at the opposite end of each cylinder for limiting the action of the spring therein, plunger means adapted to extend into said cylinder to compress either spring independently of the other.

8. A sway brace for piping which comprises a cylinder having at opposite ends thereof abutments for the ends of springs, opposed coil springs mounted respectively on opposite ends of the cylinder with their ends engaging said abutments, a tubular abutment positioned centrally within the cylinder adapted to limit the extension of each of said springs, a plunger fitted in said tubular abutment and adapted to be moved therefrom into engagement with the end of either spring and a plunger rod secured to said plunger and extending through the interior of one spring and one end of the cylinder.

9. A sway brace for piping which comprises a cylinder having at opposite ends thereof abutments for the ends of springs, opposed coil springs mounted respectively on opposite ends of the cylinder with their ends engaging said abutments, a tubular abutment, a rubber connecting means securing said tubular abutment centrally within the cylinder whereby to limit the extension of each of said springs and to absorb some of the energy released from said springs after compression, a plunger fitted in said tubular abutment and adapted to be moved therefrom into engagement with the end of either spring and a plunger rod secured to said plunger and extending through the interior of one spring and one end of the cylinder.

10. A sway brace for piping which comprises opposed cylinder frame means, abutments at opposite ends of the opposed cylinder frame means, a compression spring in each cylinder bearing against said abutment, plunger means movable in said cylinders for engaging the opposite ends of the springs, means for connecting said plunger means and cylinder frame means, one to an anchorage and the other to the piping, said sway brace being characterized by at least a part of one of the springs being arranged and adapted to come into and go out of action before the plunger means has passed substantially beyond a mid-operating position.

11. A sway brace for piping which comprises a pair of tension springs of different load/deflection characteristics arranged at a distance apart, plunger means between them having lost-motion connection with each in effective engagement with each at a position approximating a mean operating position, whereby movement in either direction will cause said plunger to engage and extend one of said springs and to move freely with lost-motion with respect to the other of said springs, and means for connecting the outer ends of the springs and said plunger means one to an anchorage and the other to the piping.

12. A device for steadying a part subjected to vibratory forces which comprises an anchored member, a spring unit connected between said part to be steadied and the anchored member, at least a part of which is of varied pitch with some of its turns closed together within its normal operating range, and a vibration damping device adapted to limit the amplitude of vibrations to which the spring unit may be subjected.

13. A device as defined in claim 3 in which the spring means comprises different springs of respectively different load/deflection characteristics for resisting movements of the piping or the like in opposite directions.

14. A device as defined in claim 3 in which the load/deflection rate of the spring means changes abruptly at a mid-point corresponding to zero loading of the spring means by said engaging means.

15. A device as defined in claim 3 in which at least one part of said spring means is pre-stressed against said limiting means, whereby said piping is held substantially immobile against safe forces, said pre-stressing being limited so that the spring means yields substantially before the limit of safe stress on the piping or the like has been reached, whereby a substantial break in the continuity of the load/deflection characteristic of the device occurs upon movement of the piping or the like from one side to the other of a mid-position.

16. A device as defined in claim 3 in which the limiting means comprises a rubber-like buffer adapted to cushion the impact when the relaxing spring reaches its limit of motion.

17. A device as defined in claim 3 in which the limiting means comprises a rubber-like buffer adapted to cushion the impact when the relaxing spring reaches its limit of motion, and the means engaging the spring means for elastic deflection thereof comprises a rubber-like buffer adapted to cushion the impact when said means in motion picks up said spring means from its limiting means.

JOSEPH KAYE WOOD.

REFERENCES CITED

The following references are of record in the file of this patent:

UNITED STATES PATENTS

| Number | Name | Date |
|---|---|---|
| 2,215,238 | Wert | Sept. 17, 1940 |
| 2,335,833 | Wood | Nov. 30, 1943 |